No. 662,138. Patented Nov. 20, 1900.
H. G. UNDERWOOD.
MOTOR VEHICLE.
(Application filed Nov. 4, 1898.)
(No Model.) 2 Sheets—Sheet 2.
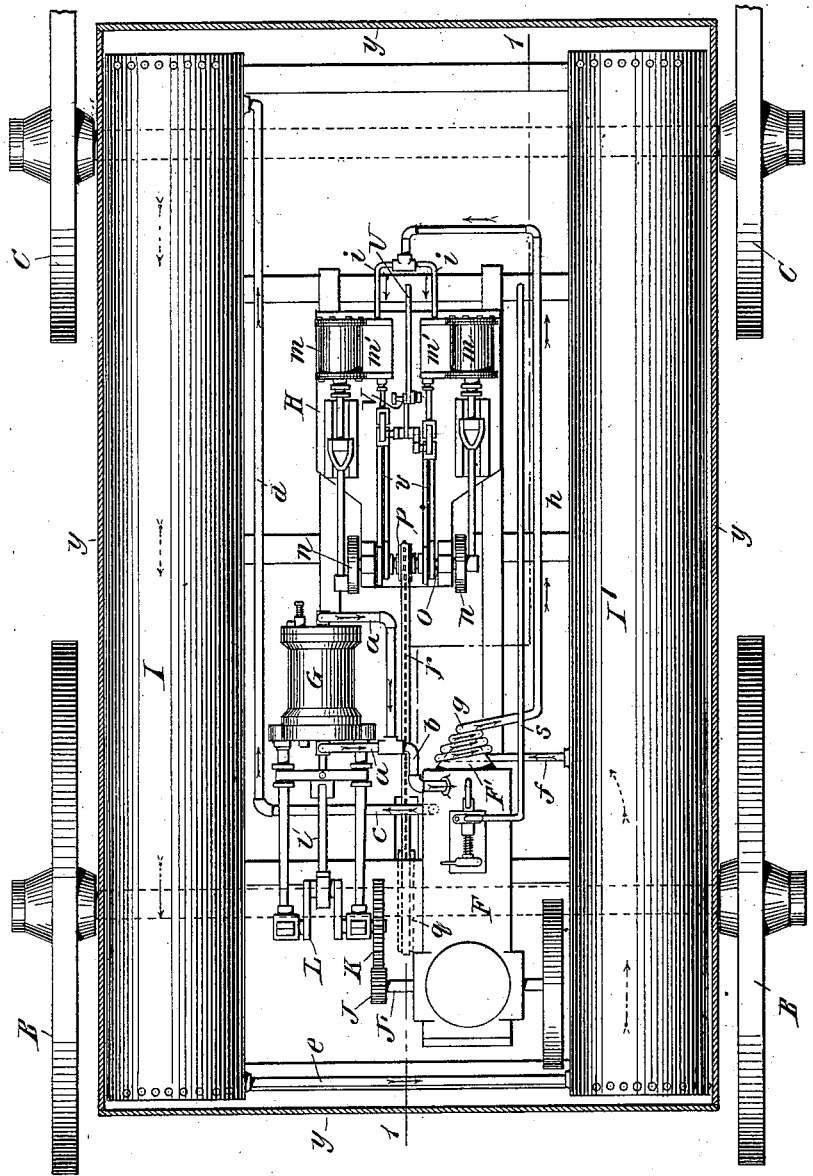
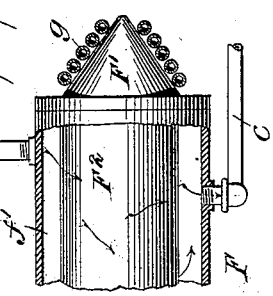
WITNESSES:
William P. Goebel.
Charles Beekman
Herbert George Underwood
INVENTOR
BY
Adam E. Schatz
ATTORNEY.
THE NORRIS PETERS CO., PHOTO-LITHO., WASHINGTON, D. C.

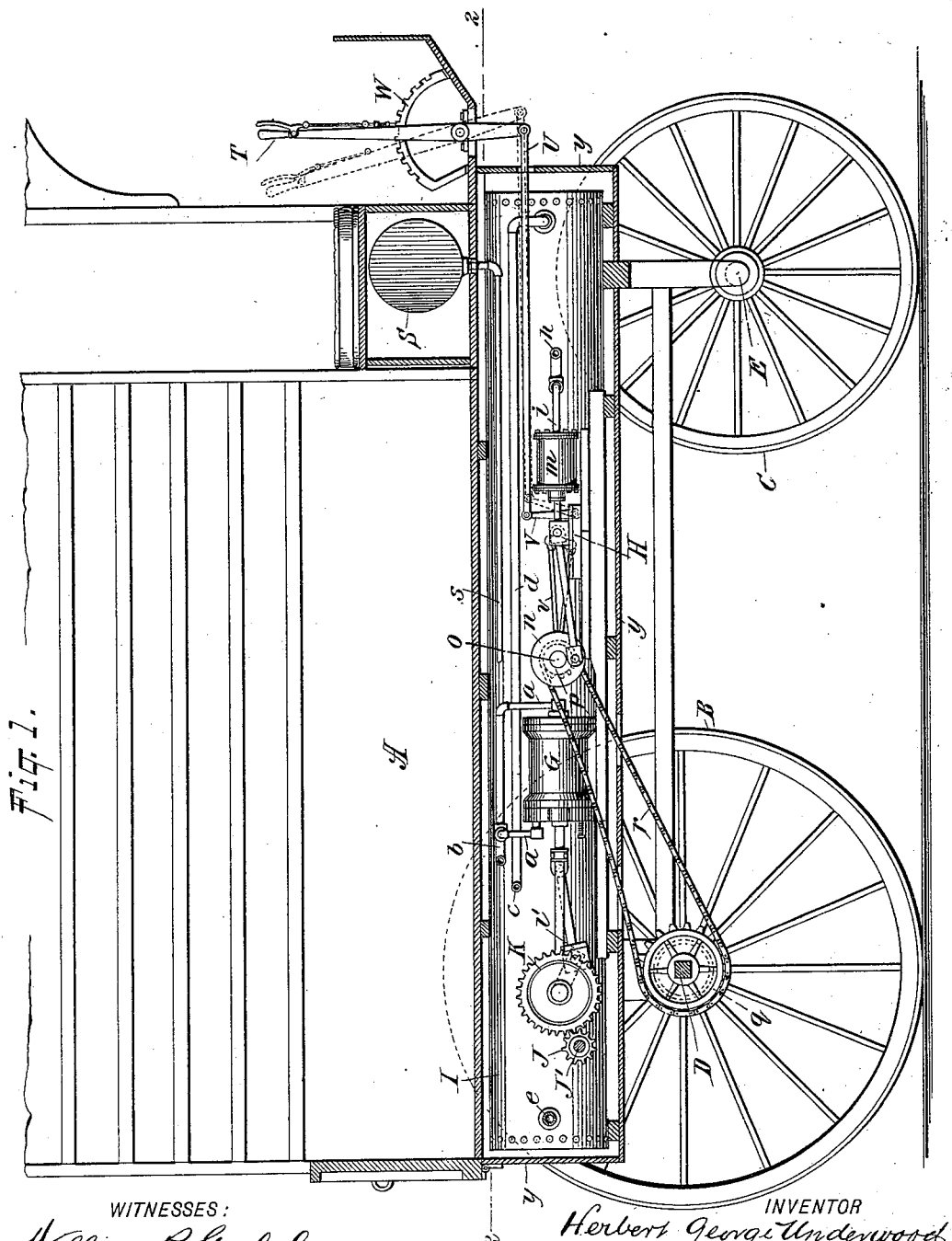

UNITED STATES PATENT OFFICE.

HERBERT GEORGE UNDERWOOD, OF NEW YORK, N. Y., ASSIGNOR, BY DIRECT AND MESNE ASSIGNMENTS, TO THE INTERNATIONAL POWER VEHICLE COMPANY, OF WEST VIRGINIA.

MOTOR-VEHICLE.

SPECIFICATION forming part of Letters Patent No. 662,138, dated November 20, 1900.

Application filed November 4, 1898. Serial No. 695,454. (No model.)

*To all whom it may concern:*

Be it known that I, HERBERT GEORGE UNDERWOOD, a citizen of the United States, residing in the city of New York, borough of Brooklyn, in the county of Kings and State of New York, have invented certain new and useful Improvements in Means for Applying the Power of Heat-Generating Motors, of which the following is a specification.

Speaking generally, this invention relates to a system in which heat generated in a motor, but not otherwise used in the production of power, is employed to heat compressed air, thereby placing it under increased pressure or increasing its volume, and in which the heated compressed air is used as the propelling means of a suitable motor. As is well known, many types of motive apparatus, while not dependent upon heat for their operation, generate in greater or less quantities, while other forms of motive apparatus, while dependent upon heat for their energy, produce it in larger quantities than can be absorbed in the production of power in the manner they are now constructed. An ordinary explosive-engine is an example of a motor of the second class. In such an engine fuel is consumed, a part of the heat produced thereby being utilized to expand the products of combustion to produce motion in the piston (or equivalent part of the engine) and a part being imparted to the engine structure. One object of my invention is therefore to prevent the accumulation of heat in an explosive-engine by imparting to it compressed air to be used as a motive power. It is also well known that explosive-engines are difficult to start and reverse or control; and a further object of my invention is to apply the mechanical power generated in such engines to the production of power through the medium of air compressed thereby and heated by the otherwise waste heat of the engine before being led to a suitable motor to energize it, the last-named motor being stopped, controlled, or reversed by a corresponding variation in the amount of heated compressed air supplied thereto and by varying the direction in which the air is supplied, as is well known in connection with the various types of air-motors, and this without varying the speed or direction in which the explosive-engine is driven, so that an explosive-engine may be employed during periods when no or a reduced amount of the compressed air is being used in the production of power to store up power by compressing air to be employed in driving the air-motor when started, thereby adapting an explosive-engine to the driving of any machinery which it is necessary to control in speed as well as to frequently stop and reverse.

Referring to the accompanying drawings, in which corresponding parts are designated by corresponding marks of reference, Figure 1 is a longitudinal sectional view taken on line 1 1 of Fig. 2, showing my invention as applied to a motor-vehicle. Fig. 2 is a horizontal sectional view taken on line 2 2 of Fig. 1. Fig. 3 is a detailed view, partly in section, showing the cylinder of the explosive-engine and the means for heating the compressed air.

As the primary source of power I provide an explosive-engine having an explosion-cylinder $F^2$, (see Fig. 3,) which through appropriate mechanism (which is well known) drives the shaft $J'$ of the explosive-engine, which in turn through the gears J and K drives the crank-shaft L, actuating the piston $l$, working in the cylinder G of an air-compressor. The air compressed in the cylinder G is led through the pipes $a\ a$ and pipe $b$ to a jacket F, surrounding the cylinder $F^2$ of the explosive-engine, and together with it forming a chamber $f'$ around the explosion-cylinder. In this chamber the compressed air is heated, increasing in volume or in pressure, and thence is led through the pipes $c$ and $d$ to the air tank or reservoir I and thence through the pipe $e$ to the air tank or reservoir $I'$, the air being finally led through the pipes $f$ and $i$ to an air-motor generating the power used. In the particular form of my invention shown the air-motor consists of a pair of coupled air-engines having cylinders $m$, valve-chest $m'$, and crank-shaft $o$, carrying thereon a sprocket-wheel $p$, from which through a sprocket-chain $v$ power generated in the air-engine by the expansion of the air is transmitted to the sprocket $q$, fastened to the rear axle D of the vehicle, driving the wheels B mounted thereon.

A suitable valve-gear V is provided for starting, stopping, controlling, and reversing the speed of the air-motor through the amount of air admitted thereto and the direction in which the air is supplied, as is well known, the valve-gear being controlled through a rod U by a lever T, mounted on the vehicle adjacent to the seat of the driver and capable of being fixed at any desired point by a rack W, as is also well known. The power exerted by the air-engine is thus controlled independently of the speed of the explosive-engine and air-compressor, and the air-motor may be stopped without stopping the pump, which during the period of stoppage of the air-engine is utilized in forcing air under pressure into the tanks or reservoirs I and I' to aid in running the air-motor when started.

For the purpose of supplying the air to the air-motor at as high a heat as possible the pipe $f$, connecting the cylinders $m$ thereof with the tank I', has formed therein a coil $g$, surrounding that end F' of the cylinder $F^2$ in which the explosion occurs, whereby the air immediately before entering the air-motor will be highly heated, in addition to the preliminary heating it has received in the chamber $f'$ prior to its entry into the air-reservoirs. This preliminary heating of the air in the chamber $f'$ effects a cooling of the cylinder $F^2$, which would otherwise reach such temperature as to destroy itself. From this it will be seen that it is important that a flow of air be maintained through the chamber $f'$ at all times while the explosive-engine is running, and this I provide for by placing the said chamber between the air-compressor and the air-tanks, for as the latter are of considerable capacity the air-compressor upon the stoppage of the air-motor can deliver a comparatively large amount of air thereto through the chamber $f'$ before the pressure in the tanks becomes excessive.

In the drawings I have illustrated the manner of mounting the power apparatus herein shown upon a vehicle. From Fig. 2 it will be seen that the explosive-engine, air-pump, and air-motor are all located between the air-tanks I and I' and in the same plane therewith, so that the whole of the propelling mechanism is placed in a compartment located beneath the flat bottom of the vehicle and between the wheels B B and C C thereof, thus reducing the height of the center of gravity of the vehicle and insuring its stability, the air tanks or reservoirs on each side of the mechanism protecting the latter. An oil-tank S may be located beneath the driver's seat and supply oil to the cylinder $F^2$ of the explosive-engine through a pipe $s$.

Having thus described my invention, what I claim, and desire to secure by Letters Patent, is—

1. The combination with an explosive-engine, having an air-chamber around its explosion-cylinder, of an air-compressor driven by the explosive-engine and supplying air to the air-chamber, an air-reservoir connected with the air-chamber, and an air-engine driven by the heated compressed air from the air-reservoir, whereby the overheating of the explosive-engine is prevented when the air-motor is stopped, substantially as described.

2. The combination with an explosive-engine, of an air-reservoir, an air-compressor driven by the explosive-engine and supplying air to the air-reservoir, means for stopping the air-motor independently of the air-compressor, and an air-heater, heated by the heat of the explosive-engine, interposed between the air-reservoir and air-compressor, substantially as described.

3. The combination with an explosive-engine, of an air-reservoir, an air-compressor driven by the explosive-engine and supplying air to the air-reservoir, means for stopping the air-motor independently of the air-compressor, an air-heater and cylinder-cooling chamber located in proximity to the cylinder of the explosive-engine and interposed between the compressor and air-reservoir, and an air-heater, heated by the heat of the explosive-engine, interposed between the air-reservoir and air-motor, substantially as described.

In testimony whereof I affix my signature in presence of two witnesses.

HERBERT GEORGE UNDERWOOD.

Witnesses:
 CHARLES BECKMAN,
 EMIL L. NEWMAN.